United States Patent
Hu et al.

[11] Patent Number: 5,707,117
[45] Date of Patent: Jan. 13, 1998

[54] ACTIVE BRAKE CONTROL DIAGNOSTIC

[75] Inventors: Hong Xing Hu; Mutasim Abdurrahman Salman, both of Rochester Hills; Michael Douglas Rizzo, White Lake; John E. Dickinson, Brighton; Douglass L. Carson, Commerce Twp.; Eldon Leaphart, Southfield; Steven Lee Tracht, Brighton, all of Mich.

[73] Assignee: General Motors Corporation, Detroit, Mich.

[21] Appl. No.: 683,881

[22] Filed: Jul. 19, 1996

[51] Int. Cl.⁶ ................. B60T 8/58; B60T 8/70
[52] U.S. Cl. ............. 303/122.08; 303/140; 303/147; 364/426.016; 180/197
[58] Field of Search ............... 303/122.08, 122, 303/122.05, 140, 146, 143, 147, 148, 199, 20; 180/197; 364/424.051, 424.053, 424.034, 424.038, 424.039, 426.016, 426.015, 426.021, 426.035

[56] References Cited

U.S. PATENT DOCUMENTS

| | | | |
|---|---|---|---|
| 3,759,582 | 9/1973 | Ohta et al. | 303/122.06 |
| 4,340,935 | 7/1982 | Anlauf et al. | 303/122.08 |
| 4,484,280 | 11/1984 | Brugger et al. | 303/122.08 |
| 4,593,955 | 6/1986 | Leiber | 303/148 |
| 4,809,183 | 2/1989 | Eckert | 303/140 |
| 4,840,243 | 6/1989 | Hirabayashi et al. | 303/122.05 |
| 4,844,556 | 7/1989 | Fennel et al. | 303/140 |
| 4,844,557 | 7/1989 | Giers | 303/140 |
| 5,219,212 | 6/1993 | Shimada et al. | 303/146 |
| 5,487,595 | 1/1996 | Wise et al. | 303/122.05 |
| 5,554,969 | 9/1996 | Eguchi | 364/424.034 |

*Primary Examiner*—Douglas C. Butler
*Attorney, Agent, or Firm*—Michael J. Bridges

[57] ABSTRACT

A comprehensive diagnostic for an active brake control system for automatically increasing braking at selected wheels of an automotive vehicle in response to detected vehicle turning maneuvers provides a hierarchy of diagnostic procedures for diagnosing local transducer and transducer circuit fault conditions, for diagnosing lack of correlation between transducers and subsystems, and for diagnosing low system level performance. Transducers or subsystems are isolated and indicated as the source of diagnosed low system performance to facilitate fault treatment procedures. Active brake control system authority is automatically reduced for at least the duration of diagnosed fault conditions.

14 Claims, 7 Drawing Sheets

ACTIVE BRAKE CONTROL DIAGNOSTIC

FIELD OF THE INVENTION

This invention relates to automotive diagnostics and, more particularly, to a diagnostic for an automotive active brake control system.

BACKGROUND OF THE INVENTION

Active brake control has been proposed for automotive vehicle stability control in which individual wheel brake inputs are provided to enhance vehicle stability through certain vehicle maneuvers. Fault conditions in the active brake control systems, such as in the various sensors, actuators, and circuits thereof, may result in unintended braking and reduced performance. Such fault conditions must therefore be rapidly diagnosed and indicated so they may be corrected. Further, until correction is made, vehicle performance should be substantially insensitive to the fault conditions. To facilitate rapid treatment of any diagnosed fault condition, the type of fault should be identified. To avoid the inconvenience of a disabled active brake control system and the cost associated with unnecessary repair of the active brake control system, a high degree of confidence should be established that a fault condition is actually present before any fault condition is indicated.

SUMMARY OF THE INVENTION

The present invention is directed to a comprehensive active brake control system diagnostic that rapidly diagnoses fault conditions in an active braking control system to minimize loss of vehicle performance and that requires substantial corroboration that the diagnosed condition is a fault condition of a particular type prior to indicating the condition for treatment thereof.

More specifically, a hierarchy of diagnostic tests are integrated to form a comprehensive system diagnostic. At a first level, individual components of the active braking system are analyzed locally to establish whether they are contributing reliable information to the system. The components are analyzed directly by the magnitude of their output signals, the rate of change in their output signals and by change in component bias adjustments that are required to correct for component bias conditions. At a second level, the components are correlated with each other and with vehicle operating conditions to establish whether contradictory information is being provided between the components or between components and operating conditions. At a third level, the performance of the system that operates with benefit of the information provided by the components is analyzed to establish whether system performance is consistent with that of a "healthy" system. Unacceptable system performance may indicate a fault condition. Operation of the suspect system may then be suspended until a fault condition of a specific character is identified and isolated at a local component level.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
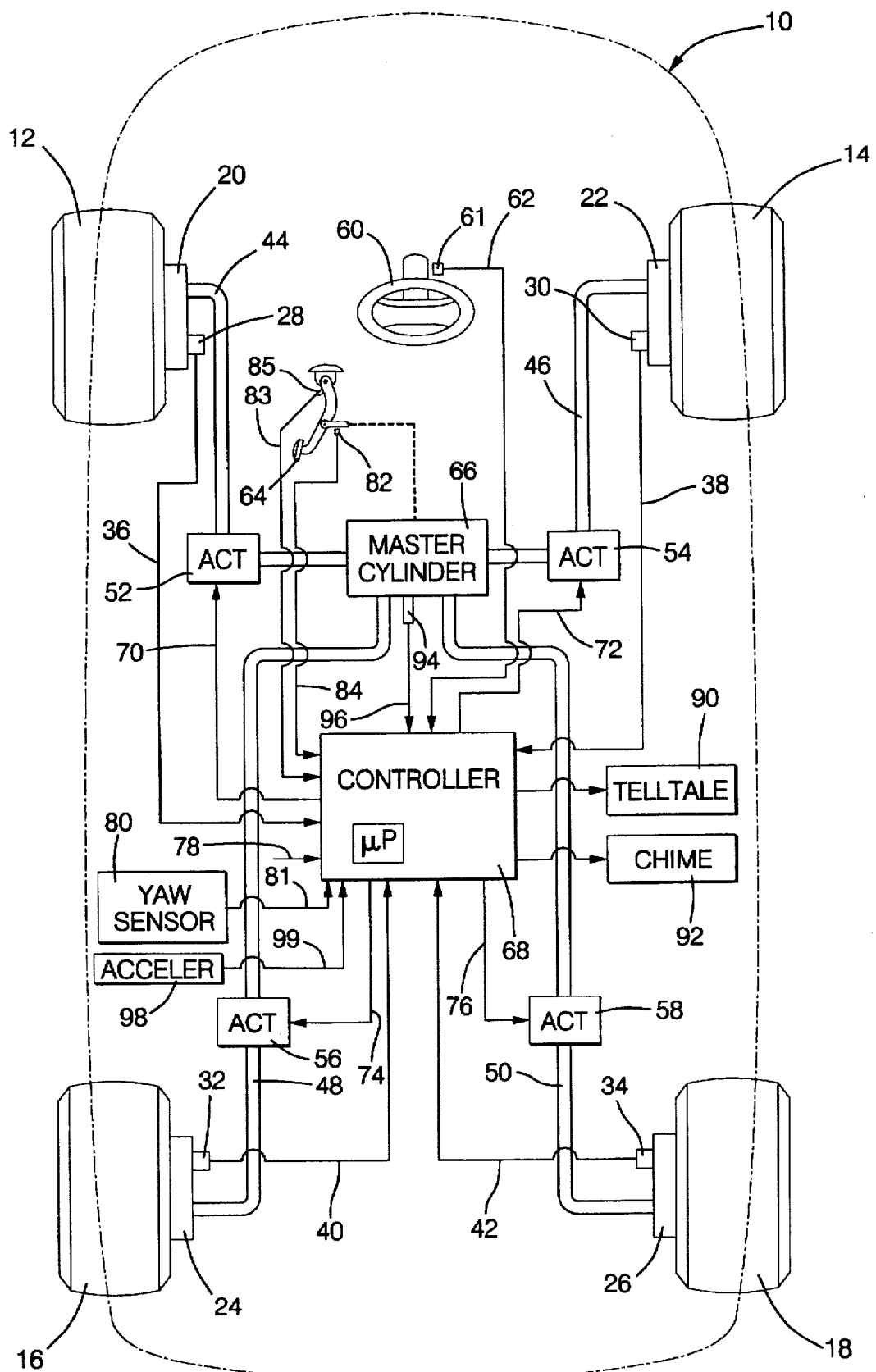
FIG. 1 is a schematic diagram of the active brake control system of the preferred embodiment.

Referring to FIG. 1, automotive vehicle 10 includes an active brake control system with a conventional microprocessor (μP) based controller 68 for controlling brakes 20, 22, 24, and 26, for respective vehicle wheels 12, 14, 16, and 18. The controller 68 includes such conventional elements (not shown) as a central processing unit (CPU) having control circuitry and arithmetic logic circuitry, memory devices including read only memory devices (ROM) for permanent read only data storage and random access memory devices (RAM) for both volatile and nonvolatile read/write data storage.

The controller 68, when activated in response to manual application of ignition power thereto, executes a series of control and diagnostic operations for reading various input signals applied thereto and for issuing control and diagnostic signals to various vehicle actuators and indicators. The input signals applied to the controller 68 include an output signal on line 81 from a conventional yaw rate sensor 80, an output signal on line 99 from conventional accelerometer 98 indicating lateral vehicle acceleration, an output signal on line 62 from a conventional digital steering wheel angle sensor 61 indicating the degree of rotational displacement of steering wheel 60 away from a predetermined initial angle, output signals on lines 36, 38, 40, and 42 from respective conventional wheel speed sensors 28, 30, 32, and 34, output signal on line 83 from conventional brake pedal displacement sensor 83 indicating a degree of depression of the brake pedal 64 away from a rest position, output signal on line 84 from conventional brake pedal switch 82 indicating whether the brake pedal is depressed away from a rest position, and vehicle speed signal on line 78, such as from a conventional vehicle speed sensor. Redundant sensors may be provided for the above sensors to improve fault detection or tolerance. For example, conventional analog steer angle sensors (not shown) may be provided in addition to digital steer angle sensor 61 for transducing a steer angle signal substantially redundant with the digital steer angle 61 output signal on line 62.

The described conventional sensors 28, 30, 32, 34, 61, 80, 82, 85, and 98 are implemented in a manner generally known to those possessing ordinary skill in the art. Vehicle ignition voltage is applied to the sensors and actuators of FIG. 1 substantially at the time ignition voltage is manually applied to controller 68, to energize such sensor and actuators in a manner generally understood in the art.

The control operations of controller 68 provide for vehicle braking control in a plurality of control modes including a base braking mode, an anti-lock braking mode, a traction control braking mode, and a closed-loop yaw rate control mode. The base braking mode provides for application of braking pressure to brakes 20, 22, 24, and 26 in proportion to a detected degree of manual depression of brake pedal 64 by a vehicle operator. The brake pedal depression operates to drive a piston (not shown) within master cylinder 66 of a conventional form which reduces a braking system control volume as is generally understood in the art, increasing the hydraulic pressure in brake lines 44, 46, 48, and 50, thereby increasing braking pressure at the wheels 12, 14, 16, and 18.

Conventional pressure transducer 94 disposed within the master cylinder 66 transduces brake fluid pressure within the master cylinder into an output signal applied to controller 68, indicating the degree of displacement of the brake pedal 64. Controller 68 generates and outputs brake pressure modulation commands to dedicated brake pressure control actuators 52, 54, 56, and 58 for varying the braking pressure at the respective wheels 12, 14, 16, and 18 away from the manually applied pressure.

The actuators 52, 54, 56, and 58 may take the form of generally known reciprocating piston actuators including a DC motor mechanically linked to a reciprocating piston to drive the piston so as to vary the control volume and thus vary the brake control pressure applied to the brakes 20, 22, 24, and 26. Alternatively, the actuators 52–58 may include simple, conventional solenoid valves for selectively coupling brakes 20–26 to a hydraulic control volume under pressure for increasing braking pressure and for selectively coupling brakes 20–26 to a reservoir (not shown) for relieving braking pressure. Alternatively, certain of the brakes 20–26 may be electric motor driven brakes, such as described in the U.S. Pat. No. 5,366,291, assigned to the assignee of this application.

In an anti-lock braking maneuver, the controller 68 varies the braking pressure at the brakes 20, 22, 24, and 26, to maximize braking pressure while minimizing any detected wheel slip condition, as is generally understood in the art. In a traction control maneuver, the controller 68 varies braking pressure at the brakes 20, 22, 24, and 26 to minimize a detected wheel slip condition. In a closed-loop yaw rate control application in which, during a detected vehicle turning maneuver, a difference between a desired yaw rate, determined as a function of steering wheel angle and rate of change in steering wheel angle and as a function of vehicle speed and lateral vehicle acceleration, provided through the described sensors of FIG. 1, and actual yaw rate as provided by yaw rate sensor 80 of FIG. 1, active braking control is provided, wherein individual or collective braking command signals are applied to the actuators 52–58 in a manner predetermined to controllably drive the yaw rate difference toward zero.

To accurately diagnose the operability of the active braking control system, including the sensors of FIG. 1 provided for indicating actual and desired yaw rate, so the negative effect on vehicle performance associated with unnecessary active braking may be avoided whenever possible yet without misdiagnosing active brake control fault conditions, the diagnostic operations of FIGS. 2–5C are carried out in a step by step manner by the controller 68 while the controller is operating. Generally, individual sensor diagnostics are periodically carried out, sensor to sensor correlation diagnostics are periodically carried out, and sensor to control system correlation diagnostics are periodically carried out to accurately yet rapidly diagnose the operability of the active brake control system in accord with this invention.

The diagnostics may be carried out when the active brake control system is activated in response to a detected vehicle turning maneuver, for example during detected turning maneuvers characterized by a high yaw rate error. Alternatively, the diagnostics may be continuously carried out while the controller 68 is operating regardless of whether the active brake control system is activated. Upon detection or diagnosis of an active brake control system fault condition and in accord with an important aspect of this invention, the active brake control system is automatically deactivated to rapidly minimize the potential negative impact of unnecessary vehicle supplemental braking. Information descriptive of the type and severity of the diagnosed fault condition may further be logged in a controller 68 memory device to facilitate off-line service procedures and may be indicated to the vehicle operator so that such service procedures may be initiated.

Figure 2:
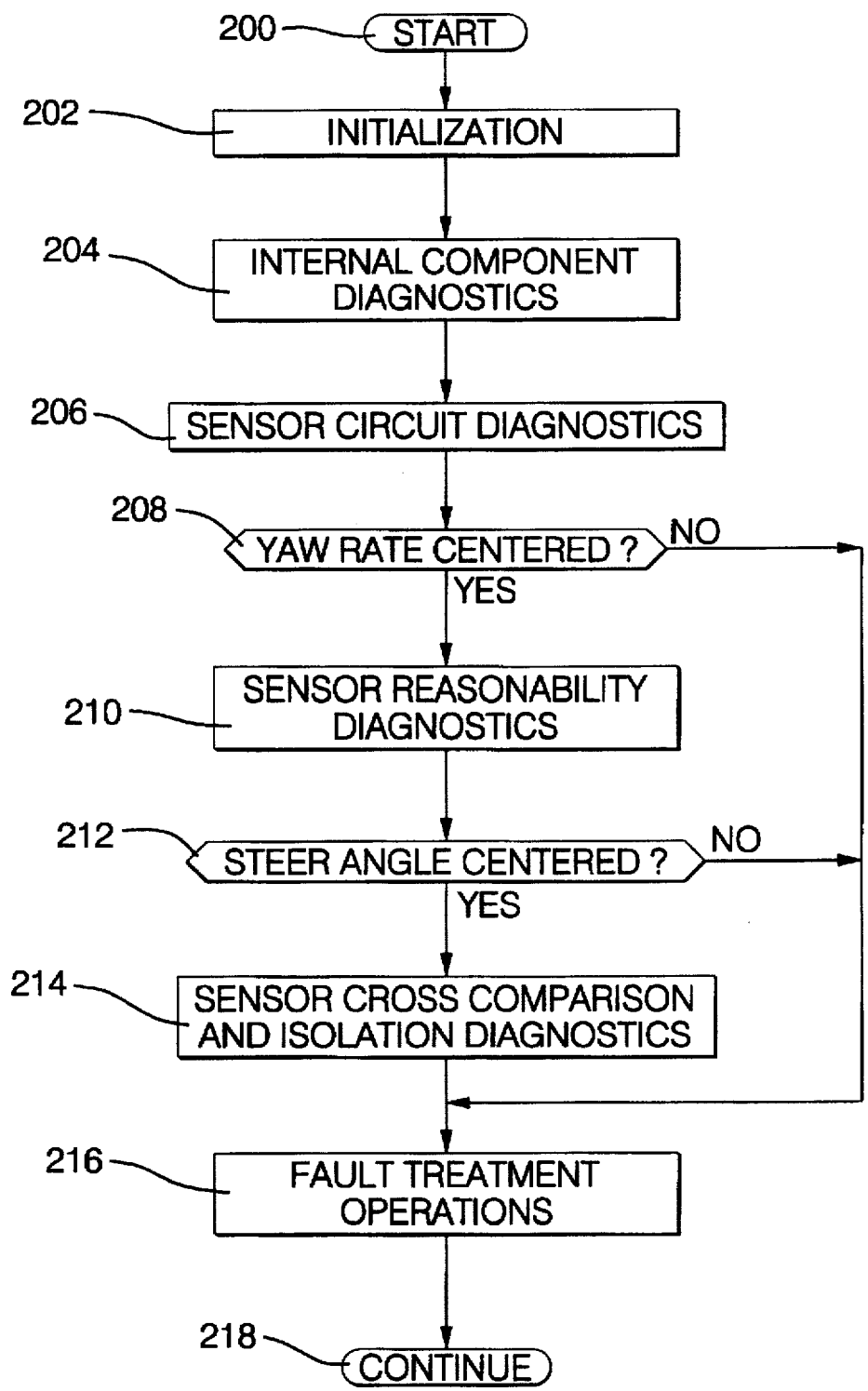
FIGS. 2, 3, 4, 5A, 5B and 5C are computer flow diagrams illustrating the series of operations for diagnosing the active brake control system of FIG. 1.

More specifically, the diagnostic begins at step 200 of the routine of FIG. 2 following application of ignition power to the controller 68. The operations beginning at the step 200 may periodically repeat while power is applied to the controller 68, such as about every ten milliseconds through a standard iterative controller timer interrupt procedure.

Following the step 200, initialization operations are executed at a next step 202 including operations to properly reset and prepare sensors and actuators of FIG. 1 for use in active brake control diagnostics in accord with this invention and in accordance with controller, actuator and sensor manufacturer specifications.

Following such initialization operations, internal component diagnostics are carried out for the accelerometer 98, yaw rate sensor 80 and steering angle sensor 61 of FIG. 1, as may be provided by manufacturers of such sensors and as described in commercially available manufacturer diagnostic specifications for such conventional sensors. Following such internal diagnostics, sensor circuit diagnostics are carried out at a next step 206 by invoking the operations of the routine of FIG. 3, beginning at a step 300. Generally, the sensor circuit diagnostic provides for continuous monitoring of sensor output signals to diagnose short circuit and open circuit conditions of the sensor and its associated circuitry.

More specifically, the sensor circuit diagnostic operations include the operations of steps 302–310 which diagnose the yaw rate sensor circuit, steps 312–316 which diagnose the lateral accelerometer circuit, and steps 318–328 which diagnose the steering wheel angle sensor circuit. The routine proceeds from the step 300 to determine vehicle speed at a step 302, such as from signal 78 of FIG. 1 which may be directly derived from an average of the wheel speed of undriven wheels of the vehicle.

Vehicle Speed is next compared at a step 304 to a test range which is set up as a vehicle speed range under which a "healthy" yaw rate sensor will transduce an output signal within a predictable range. The speed range in this embodiment includes zero speed and speed values above a calibrated threshold speed. If vehicle speed is not determined to be within the speed range at the step 304, the yaw rate sensor circuit diagnostic operations are bypassed by proceeding directly to a step 312. If vehicle speed is within the test range at the step 304, the yaw rate sensor circuit diagnostic procedures are continued by reading the yaw rate sensor output signal on line 81 of FIG. 1 at a next step 306 and determining, at a next step 308, if yaw rate sensor readings, including a plurality of prior yaw rate sensor readings from a plurality of prior iterations of the routine of FIG. 3 and including the current reading, are persistently outside a calibrated signal range.

Figure 3:
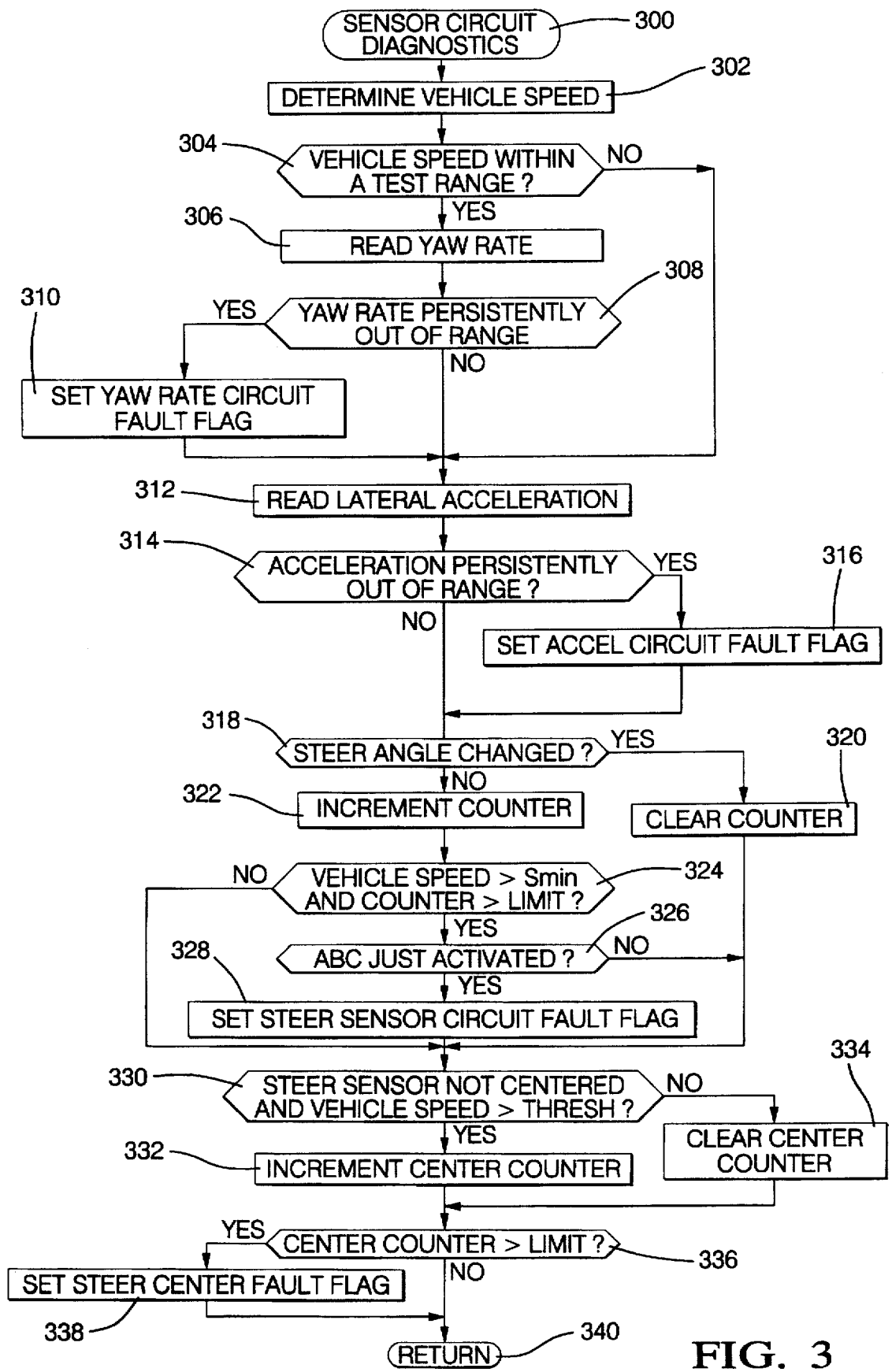

The signal range in this embodiment is calibrated as extending from 0.25 volts to 4.75 volts. If so, a yaw rate sensor circuit fault flag is set at a next step 310. Next, or if the yaw rate sensor readings are determined to not persistently be outside a calibrated range at the step 308, the lateral accelerometer output signal on line 99 of FIG. 1 is read at a step 312, and is compared to a calibrated signal range extending from 0.25 volts to 4.75 volts in this embodiment at a next step 314. If the accelerometer output signal, including prior output signals read during prior iterations of the routine of FIG. 3, is determined to be persistently outside the calibrated range at the step 314, an accelerometer circuit fault flag is set at a next step 316.

Next, or if the accelerometer signal is determined to not be consistently outside the range at the step 314, digital steering angle sensor circuit diagnostics are initiated by assessing whether any change in the steering angle indicated by the steering angle sensor 61 on line 62 of FIG. 1 is detected. A change may be indicated by comparing the current signal on line 62 of FIG. 1 to a most recent prior read signal on line 61 at a step 318. If no change is detected, a counter is incremented at a next step 322. A change is defined in this embodiment as greater than one degree of sensed change in steering angle. The counter maintains a count of the number of iterations of the routine of FIG. 3 in which no such change is detected.

It is expected that a normally functioning steering angle sensor will frequently undergo significant change (greater than one degree) in its output signal and therefore any extended period of time during which no such change is noticed indicates a steering angle sensor circuit fault condition. Accordingly, the counter is next compared, at a step 324, to a limit value of about two hundred corresponding to about two seconds of time for the ten millisecond iteration rate of the routine of FIG. 2, and if the counter exceeds the limit and the vehicle speed is greater than a calibrated minimum threshold indicating the vehicle is not stopped, a check is made at a next step 326 of whether the active brake control system has just been activated which is typically due to a change in vehicle attitude during a vehicle turn maneuver.

If the active brake control system has been activated yet no steering angle change is detected at the step 324, a fault condition is assumed to be present in the digital steering angle sensor circuit and a flag is set indicating such condition at a next step 328, and then a step 330 is executed. No such flag is set if the vehicle is not moving as determined at the step 324 or if the active brake control system is not recently activated as determined at the step 326, by proceeding directly to step 330. Returning to the step 318, if a change in the steering angle is detected, the counter is cleared at a next step 320 and the step 330 is executed.

The steps 330–338 provide for diagnosing operability of a procedure reliant on the steering angle sensor 61 of FIG. 1, the lateral accelerometer 98 of FIG. 1, and the yaw rate sensor 80 of FIG. 1. If the procedure is unable to properly function, a fault condition indicating inoperability of one of more of such sensors is indicated.

Specifically, the procedure of determine a "center" position of the steering wheel 60 is diagnosed through the operations of steps 330–338. If the centering procedure is unable to return a center position within a reasonable time while the vehicle speed is relatively high, a fault condition is flagged. The centering procedure of this embodiment is as described in copending U.S. patent application Ser. No. 08/664,321, filed May 23, 1996, attorney docket number H-195602, assigned to the assignee of this application and hereby incorporated herein by reference. Specifically, if the steer sensor is not centered through the operations of the incorporated reference as determined at the step 330 and vehicle speed is greater than a calibrated threshold THRESH, a center counter is incremented at a step 332. The center counter is cleared at a step 334 once the steer sensor is centered or if vehicle speed drops below THRESH. Following the step 332, the center counter is compared to a calibrated limit value set up as the maximum amount of time tolerated for the steer center routines of the incorporated reference to return a center position. If the counter exceeds the limit value at the step 336, a steer center fault flag is set at a step 338.

Next, or if the center counter does not exceed the limit at the step 336 or following the step 334, the operations of the routine of FIG. 3 to diagnose sensor circuitry are complete and the routine returns, via step 340, to execute a next step 208 to determine whether the yaw rate sensor is centered. The centering of the yaw rate sensor for sensor initialization is as provided in the incorporated reference, in which a sensor output signal corresponding to a center yaw position is returned for use in active brake control operations.

Figure 4:
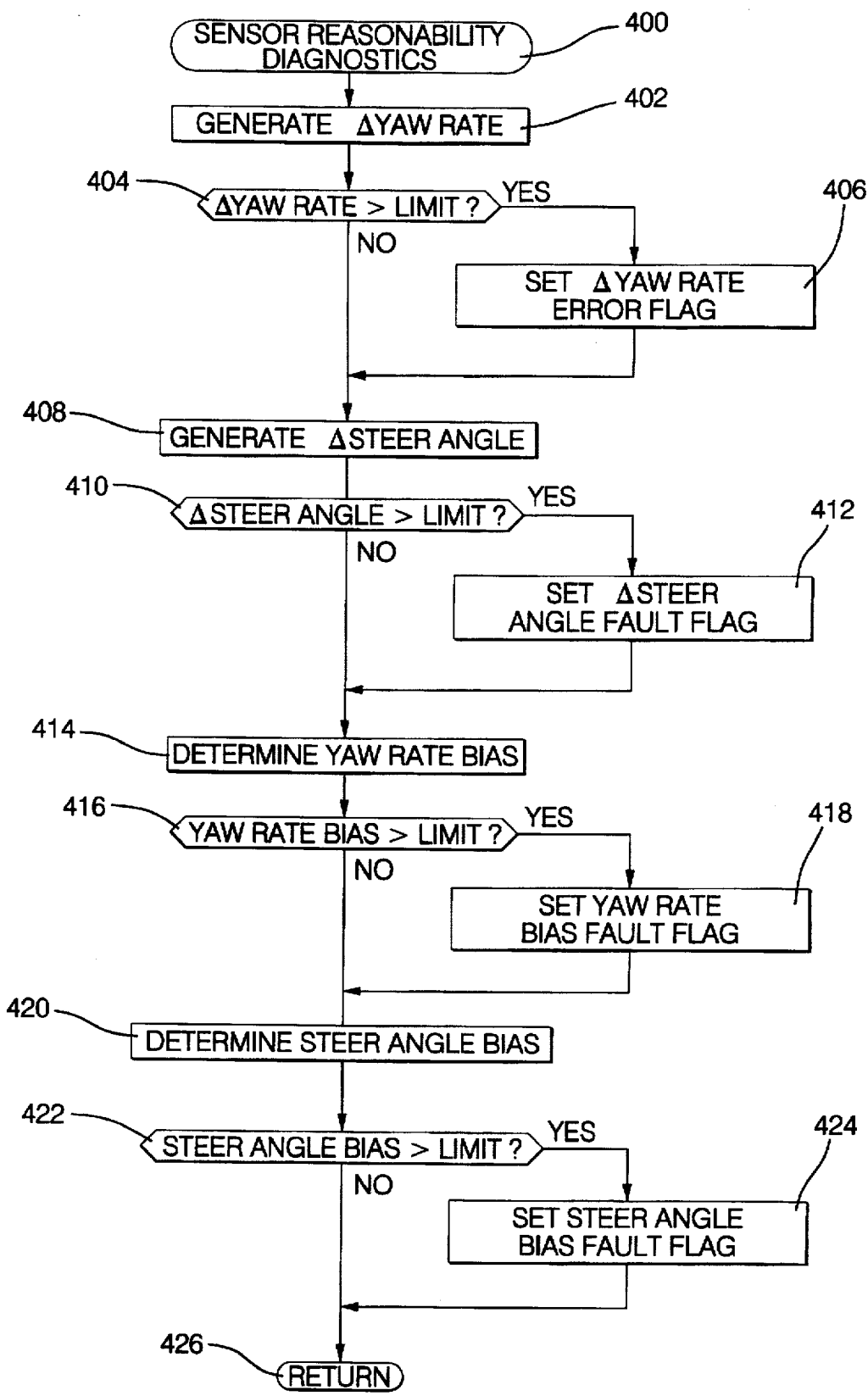

If the yaw rate sensor is determined to not be centered, further diagnostic operations are avoided by proceeding to a step 216, to be described. However, if the yaw rate sensor is determined to be centered at the step 208, sensor reasonability diagnostics are next carried out at a step 210, by proceeding to the operations of the routine of FIG. 4, beginning at a step 400. Generally, the operations of the routine of FIG. 4 are provided to ascertain whether the sensor output signals used in active brake control are, given physical limitations of the control system, reasonable.

Specifically, a time rate of change in yaw rate is determined at step 402 for example by differentiating a plurality of yaw rate signals read from line 81 of FIG. 1. The time rate of change in yaw rate ($\Delta$yaw rate) is compared to a calibrated limit at a next step 404. The yaw rate limit is established as a function of the specific inertia of the vehicle. Because the vehicle has a specific inertia, its maximum angular acceleration is limited.

A significant rate of change in yaw rate sensor output that exceeds the physical capability of the vehicle indicates a yaw rate sensor fault condition and is indicated at a step 406 if $\Delta$yaw rate exceeds the calibrated limit. After indicating the fault condition at step 406, or if no such condition is determined to be present at the step 404, a time rate of change in steering angle is next determined at a step 408, such as by differentiating a plurality of steering angle sensor signals from line 62 of FIG. 1. The time rate of change in steering angle ($\Delta$steer angle) is next compared to a limit value at a step 410. The limit is established as the maximum time rate of change in steering angle for given dynamics of the vehicle and of the steering system of the vehicle, and is calibrated for a specific vehicle type through a conventional calibration procedure.

If $\Delta$steer angle exceeds the limit at the step 410, a $\Delta$steer angle fault condition flag is set at a next step 412 and next, or if no fault condition is detected at the step 410, a check of yaw rate bias is carried out via steps 414–418. For a given yaw rate sensor, a maximum sensor error may be specified and a corresponding maximum sensor bias to compensate the error may be established. The bias determined through the brake control system of this embodiment to compensate any detected yaw rate sensor error, which error may be defined as a difference between the current yaw rate center value returned from the operations described in the incorporated reference and any of a prior number of returned center values, is referenced or conventionally determined at a step 414 and is compared to the maximum bias (bias limit) at a next step 416. If the bias exceeds the limit, a yaw rate bias fault flag is next set at a step 418 to record the condition of excessive yaw rate sensor error and thus excessive yaw rate sensor bias. Following the step 418, or if the bias limit is not exceeded at the step 416, a steer angle sensor bias diagnostic is provided through the next steps 420–424.

Generally, the steer angle bias check is made to determine if the steer angle center position has changed significantly between the current center position and a prior center position, indicating a loss of steering pulses from the sensor 61 of FIG. 1, as described in the incorporated reference. A steer angle bias is determined as a difference between the current center position and a prior center position, or between two recent center positions. If the bias exceeds a bias limit at a next step 422, a steer angle bias fault flag is set at a step 424.

Next, or if the steer angle bias does not exceed the limit at the step 422, the operations of FIG. 4 are complete, and a step 426 is executed to return to the operations of FIG. 2, at which a next step 212 is executed to determine if the steer angle center operations of the incorporated reference have returned a steer angle center position. If a center position has not been returned, further diagnostic operations are avoided by proceeding to a next step 216, to be described. Otherwise, if a center position has been returned, a next step 214 is executed to initiate the sensor cross comparison and isolation operations of FIGS. 5A, 5B, and 5C, beginning at a step 500.

Generally, the hierarchical diagnostic operations in accord with this invention provide, once individual sensors and sensor circuits appear, through the operations of FIGS. 3 and 4, to be operating as expected for a fault free system, for correlation of the sensor output signals with other operating parameters that may indicate sensor operability, to diagnose overall active brake control system performance, and to isolate the culpable sensor or sensors as the source of any detected performance fault condition.

Redundant sensors, such as digital and analog steer angle sensors are checked against each other. The yaw rate sensor is checked against the a yaw rate determined as a function of undriven wheel speed differences across the vehicle. The lateral accelerometer is analyzed for an unreasonable estimate of road surface bank angle. Lack of correlation indicates a fault condition is present, and then a dynamic model is applied to isolate the specific sensor responsible for the condition.

Figure 5A:
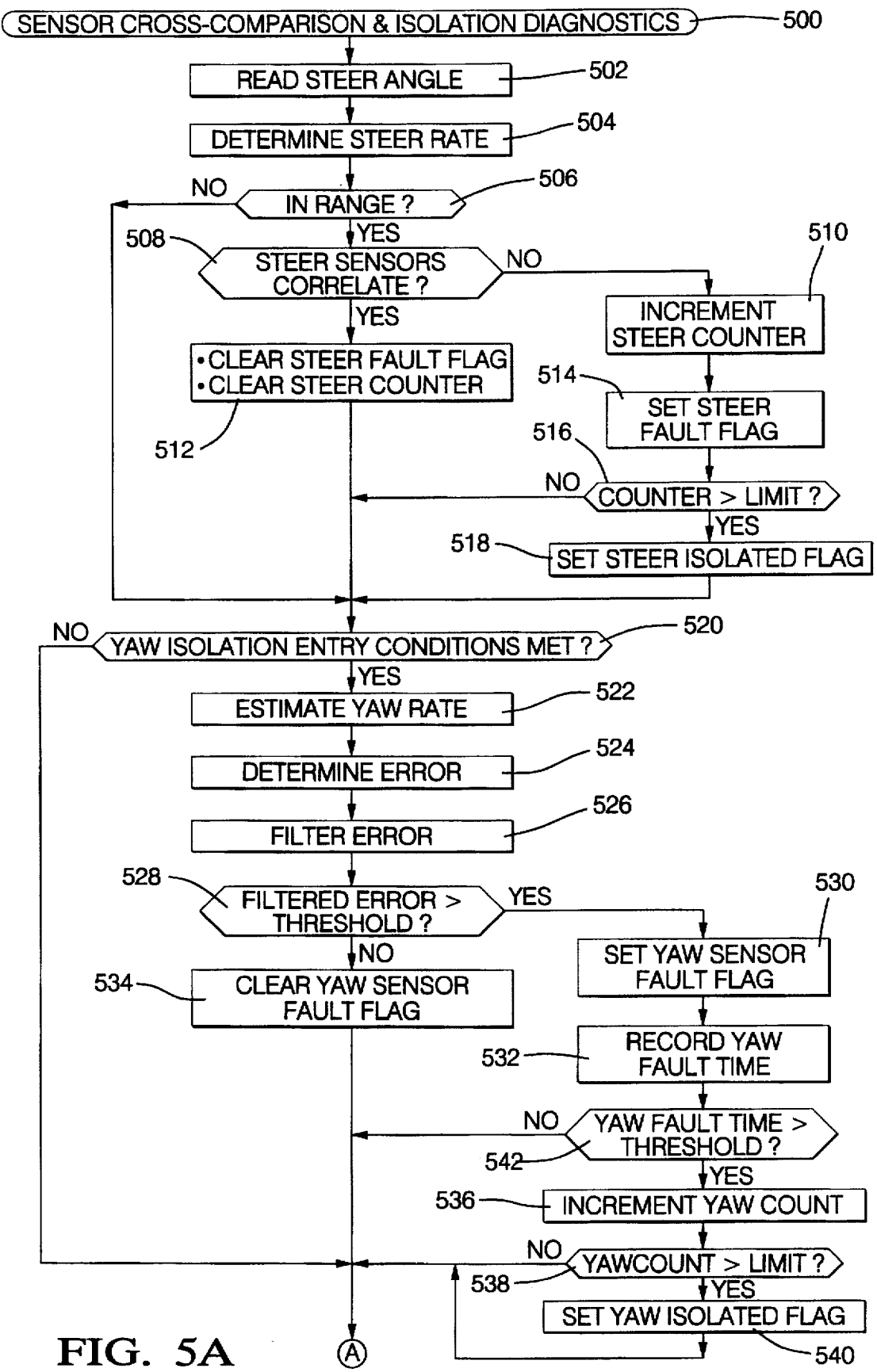
Figure 5B:
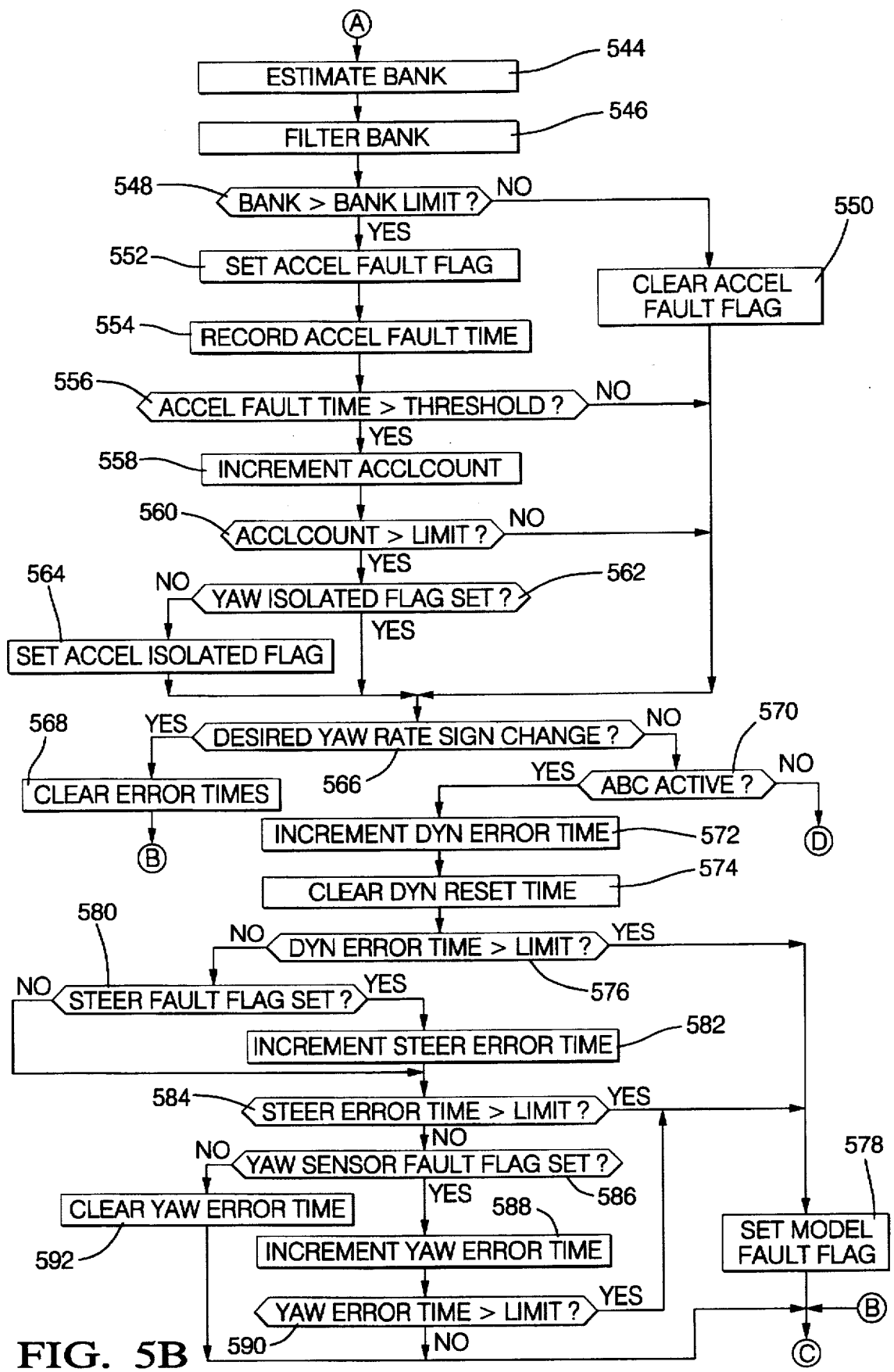
Figure 5C:
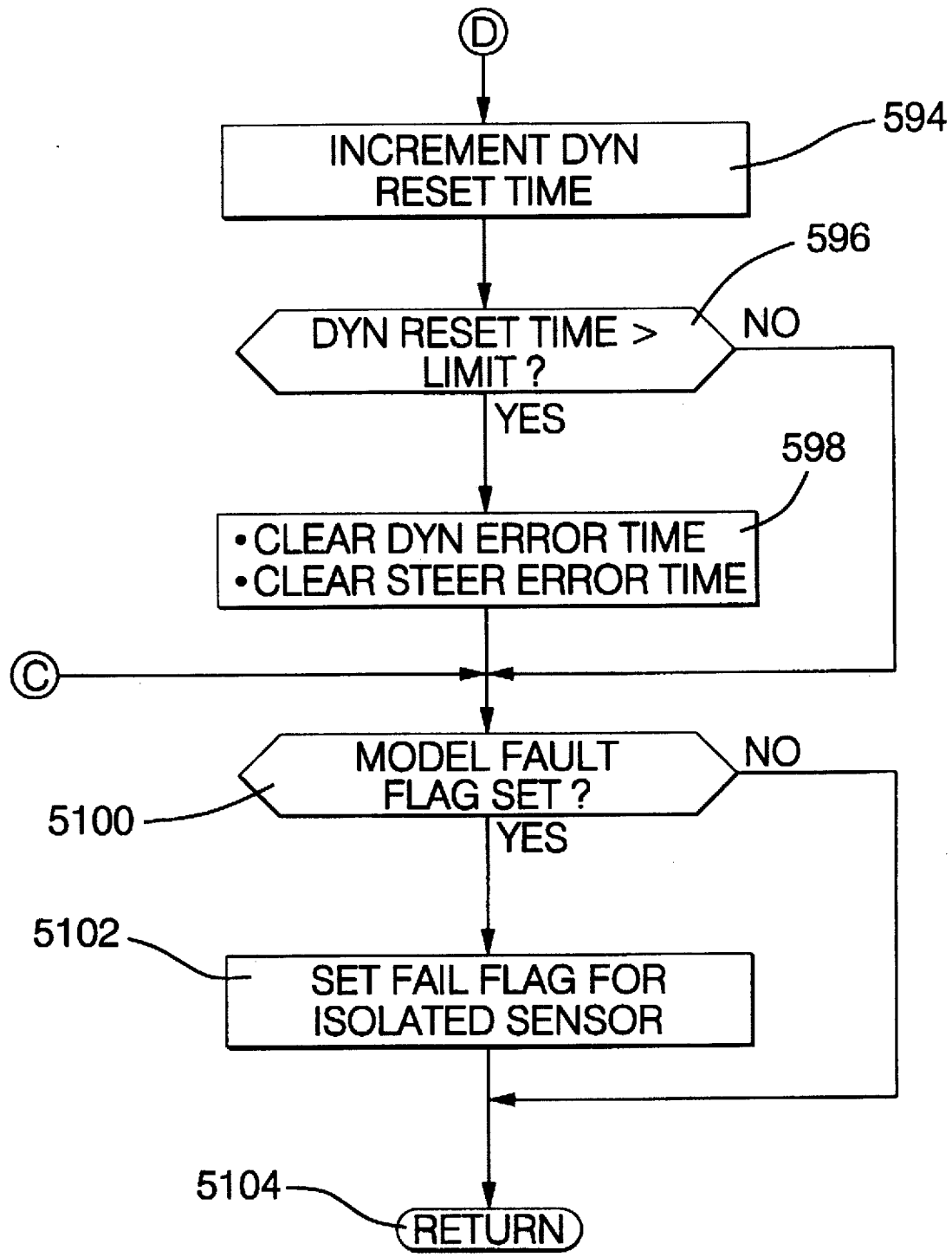

Specifically, the routine of FIGS. 5A–5C proceeds from an initial step 500 to diagnose and isolate steer sensor fault conditions at the steps 502–518. First, digital steer angle is read at a step 502, such as from the signal on line 62 of FIG. 1, and steering angle rate indicating a time rate of change in steering angle is determined at a next step 504, such as by differentiating a plurality of recent digital steer angle values. If the steering angle rate is within a calibrated range limited by 225 degrees of steering wheel rotation as determined at a next step 506, then it may be correlated against the analog steer angle sensor which saturates, in this embodiment above 225 degrees of steering wheel rotation.

Generally, the range applied at step 506 is set up as a steer angle sensor operating range within which the multiple steering angle sensors should normally correlate. If the steer angle is within the range, and the analog and digital steer angle sensors of this embodiment correlate at a next step 508, then a steer counter and a steer angle fault flag are cleared at a next step 512 to clear any prior indicated steer angle fault conditions. If the steer sensors do not correlate, for example due to the output signals of the multiple sensors indicating substantially different steer angles, then a steer counter is incremented at a next step 510, and a steer fault flag is set at a next step 514.

If the counter exceeds a calibrated count limit at a next step 516, then the lack of correlation between the steer sensors is assumed to be sufficiently persistent that a fault condition is present and is isolated to the steer angle sensors, and a steer isolated flag is next set at a step 518. Next, or if the counter does not exceed the limit at the step 516, the steer angle isolation operations are complete and correlation and isolation operations for the yaw rate sensor are next carried out as represented by steps 520–542.

Specifically, a series of entry conditions are analyzed at a step 520 to determine if vehicle operating conditions are consistent with an accurate assessment of the operability of the yaw rate sensor 80 of FIG. 1. Such conditions include, in this embodiment, no manual braking by the vehicle operator, such as may be indicated by brake switch 82 (FIG. 1) being driven manually to a closed position, anti-lock braking operations being inactive, and vehicle speed indicated by the signal on line 78 of FIG. 1 being above a calibrated minimum speed above which reliable individual wheel speed information is assumed to be available.

If such entry conditions are not met, the yaw rate sensor diagnostic of FIG. 1 is not executed for this iteration of the diagnostic of FIG. 2 by proceeding directly to a next step 544. Alternatively, if the entry conditions are met, yaw rate sensor correlation and isolation operations are carried out by estimating actual vehicle yaw rate at a next step 522 as a function of undriven wheel speed information as follows:

$$Eyr = WB*(Sl-Sr)$$

in which Eyr is estimated actual yaw rate, WB is the vehicle wheel base, Sl is the wheel speed for the left undriven vehicle wheel, such as from the signal on line 40 from sensor 32 of FIG. 1, and Sr is the wheel speed for the right undriven vehicle wheel, such as from the signal on line 42 from the sensor 34 of FIG. 1. Yaw rate error ERROR is next determined at a step 524 as a difference between the measured yaw rate from the signal on line 81 from sensor 80 of FIG. 1 (following any standard filtering that may be required) and the estimated actual yaw rate Eyr.

The error is next filtered by passing it through a simple lag filter with approximately a two Hertz bandwidth at a step 526. The filtered error is then compared to a calibrated error threshold at a step 528. If the error exceeds the threshold, a yaw sensor fault flag is set at a next step 530, and the amount of time the fault flag is set is recorded at a next step 532. Tire scrubbing effects during significant acceleration turns on such surfaces as concrete or side slip effects on ice can lead to misleading yaw rate estimates from the wheel speed signal information, leading to misleading high yaw rate error. Such conditions are typically short in duration.

To avoid diagnosing the significant yaw rate error during such conditions as a yaw sensor fault condition, the time of a significant yaw rate error is recorded and no yaw rate sensor fault condition is diagnosed until the condition persists for a time greater than a calibrated time, such as five seconds. Accordingly, at a next step 542, the amount of time of endurance of the significant error condition is compared to a predetermined time threshold set to one second in this embodiment. If the time exceeds the threshold, a counter yawcount is incremented at a next step 536 and yawcount is then compared to a count limit, set to five for example, at a next step 538. If yawcount exceeds the limit, the significant error condition has been present for a sufficient time period that a vehicle maneuver is assumed to not be the cause of the significant yaw rate error, and a yaw rate sensor fault condition is isolated as the source of the significant error. A yaw rate sensor isolated flag is then set at a next step 540 to indicate that the yaw sensor is determined as being responsible for a fault condition in the active brake control system.

Returning to step 528, if the filtered error does not exceed the error threshold, the yaw sensor fault flag is cleared at a next step 534 and next, or if the yaw fault time was less than the time threshold of about one second at the step 542, or if the yawcount was less than the limit at the step 538, or following the step 540, the yaw rate sensor correlation and isolation operations are concluded by proceeding to the accelerometer isolation and correlation operations of steps 544–564, which begin by estimating a vehicle bank value BANK at a step 544 as follows:

$$BANK = LA - (YR*V)$$

in which LA is lateral vehicle acceleration indicated by the accelerometer 98 (FIG. 1) output signal on line 99, YR is the yaw rate indicated by the yaw rate sensor 80 (FIG. 1) output signal on line 81, and V is vehicle velocity as indicated by the signal on line 78 of FIG. 1. The bank angle BANK is checked for reasonableness through the operations of the current routine to verify accelerometer operability. As yaw rate sensor information is also used in the determination of BANK, the yaw rate sensor 80 must be diagnosed prior to the diagnosis of the accelerometer to protect against misdiagnosis. Accordingly, the operations described for correlating and isolating the yaw rate sensor must be allowed to fully diagnose the yaw rate sensor prior to diagnosis of the accelerometer through the steps 544–564.

Returning to step 544, after determining BANK, which indicates current vehicle bank angle, BANK is filtered through a conventional simple lag filter process with about two Hertz bandwidth at a step 546, and the filtered BANK is compared to a calibrated BANK LIMIT at a next step 548 which limit may vary with vehicle operating conditions. If BANK exceeds BANKLIMIT, an accelerometer fault flag is next set at a step 552 and the time in the fault condition recorded at a next step 554. The recorded time is then compared to a fault time threshold of about two seconds at a next step 556. If the fault time exceeds the two second threshold, a counter ACCLCOUNT is incremented at a next step 558 and is then compared to a count limit at a step 560. If ACCLCOUNT exceeds the limit, which may correspond in magnitude to the limit described for the yaw rate sensor isolation operation at the step 538, and the yaw sensor isolated flag is not set a next step 562, then the fault condition resulting in the excessively large BANK value is isolated as a fault condition in the accelerometer, and an accelerometer isolated flag is set at a next step 564.

Returning to step 548, if BANK does not exceed BANKLIMIT, the accelerometer fault flag is cleared at a next step 550. Next, or if the accelerometer fault time does not exceed the time threshold at the step 556, or if ACCLCOUNT does not exceed the count limit at the step 560, or if the yaw isolated flag is already set indicating the yaw rate sensor is assumed to be responsible for the out of range BANK value, or following the step 564, the accelerometer correlation and isolation conditions are concluded and the routine moves to steps 566–598 to apply a dynamic fault detection model for detecting dynamic fault conditions for steer error, yaw rate error and overall dynamic rate error.

When the sign of the desired yaw rate determined through operations of the active brake control system change, the error model resets. The dynamic fault detection model only runs while active brake control is active to diagnose sensor operability from the dynamic response of the control system. Specifically, the sign of the desired yaw rate is analyzed at a first step 566 to determine if the sign has changed from the last iteration of the current routine. If the sign has changed, all error times are cleared at a next step 568 and the dynamic fault detection model is bypassed by proceeding to a next step 5100, to be described.

Alternatively, if no sign change has occurred in desired yaw rate, and active brake control is active as determined at a next step 570, then a dynamic error timer indicating the time in active brake control is incremented at a next step 572. A dynamic reset time is next cleared at a step 574 to indicate that any active brake control reset period is complete. The dynamic error time is next compared to a calibrated time limit set as the maximum time a healthy active brake control system should normally be active to resolve a yaw rate error condition.

It should be noted that the active brake control system of this embodiment becomes active during a vehicle turning maneuver with substantial detected vehicle yaw rate error, as is generally understood in the art. Once the substantial yaw rate error is effectively compensated, the active brake control system is deactivated so that no further supplemental and selective vehicle braking occurs therefrom. The active brake control system is established to responsively compensate yaw rate error conditions and therefore, when healthy, should not be active for extended periods of time. Such active brake control operation is consistent with that described in copending U.S. patent application Ser. No. 08/654,982, filed May 29, 1996, attorney docket No. H-194784, assigned to the assignee of this application to issue on Sept. 16, 1997 as U.S. Pat No. 5,667,286. Accordingly, if the dynamic error time exceeds the limit, a model fault flag is set at a next step 578, and a step 5100, to be described, is then executed.

Returning to step 576, if the dynamic error time does not exceed the limit, and a steer fault flag is set as determined at a next step 580, for example as may have been set at the described step 514, then a steer error time is incremented at a next step 582 to monitor the time the steer error is diagnosed. Next, or if the steer fault flag was not determined to be set at the step 580, the steer error time is compared to a calibrated steer error time limit at a step 584 and if the steer error exceeds the time limit, a model fault flag is set at the described step 578, after which the step 5100 is executed.

Alternatively, if the steer error time does not exceed the limit as determined at the step 584, then a next step 586 is executed to determine if a yaw sensor fault flag is set, such as may have been set at the described step 530. If the yaw sensor fault flag is set, a yaw error time is incremented at a next step 588, and is then compared to a calibrated yaw error time limit at a next step 590. If the yaw error time exceeds the time limit, then the described step 578 is executed to set a model flag. If the yaw sensor fault flag is not set at the step 586, the yaw error time is cleared at a next step 592. Following step 592, or if the yaw error time does not exceed the limit at the step 590, step 5100 is executed.

Returning to step 570, if active brake control is determined to not be active, a dynamic reset time is incremented at a next step 594 to indicate the duration of the time active brake control is inactive, and the dynamic reset time is next compared to a calibrated time limit at a step 596. If the dynamic reset time exceeds the time limit, the dynamic error time and a steer error time are cleared to clear any previously indicated dynamic errors, to ensure a small error condition will not force a timer to reach a limit during an extended driving period.

Next, or if the dynamic reset time does not exceed its limit at the step 596, a check is made at step 5100 to determine if a model fault flag is set, such as through execution of the step 578. If a model fault flag is determined to be set, a fail flag corresponding to any "isolated" sensor is set at a next step 5102. An isolated sensor is a sensor having a set "sensor isolated flag,", such as through execution of any of the described steps 518, 540, or 564, indicating that the specific sensor has been isolated as the sensor responsible for any diagnosed general system fault condition, such as any of the fault conditions already diagnosed through the operations of FIGS. 5A and 5B. Such isolation flag operates to facilitate further fault diagnosis and treatment procedures, such as by a repair technician following submission of a vehicle for service.

If the fault flag is not determined to be set at the step 5100, or following the step 5102, the sensor cross-comparison and isolation operations of the routine of FIGS. 5A–5C are concluded and step 5104 is executed to return to FIG. 2, to execute a next step 216 to carry out fault treatment operations for any diagnosed fault condition to minimize brake control disruption, which include, in this embodiment, temporary suspension of active brake control operations and indication of such action to the vehicle operator.

More specifically, if a sensor circuit fault flag has been set, such as at any of the steps 310, 316, or 338 of the operations of FIG. 3, if a fault flag has been set at any of the steps 406, 412, 418, or 424 of the operations of FIG. 4, or if the model fault flag has been set at the step 578 of the operations of FIG. 5B, then the active brake control operations are suspended for the duration of such diagnosed fault condition and an indication of such fault condition and the suspension of active brake control operations is made to the vehicle operator, such as by illuminating an indicator visible to a vehicle operator, such as telltale 90 of FIG. 1, or by energizing a chime audible to the vehicle operator, such as chime 92 of FIG. 1.

To aid in fault identification and treatment operations, which may be provided off-line by a service technician following diagnosis of an active brake control system fault condition, fault identification information established through the described operations of the routines of FIGS. 3–5C indicating the source of the diagnosed fault condition and its severity may be logged by controller at the step 216 of FIG. 2 in a non-volatile controller memory device, such as a conventional non-volatile random access memory device which may be included as a standard component of controller 68 of FIG. 1 through the exercise of ordinary skill in the art. The logged identification information may include the status of at least those of the fault flags of this embodiment that have been set and any other information established through the operations of this embodiment that may indicate the source of a fault condition, its persistence, and its severity. After treating any diagnosed fault conditions at the step 216, a next step 218 is executed to continue to execute any additional diagnostic, control, or maintenance operations that may be required for the active brake control system integrated with the diagnostic of this embodiment.

The preferred embodiment for the purpose of explaining this invention is not to be taken as limiting or restricting the invention since many modifications may be made through the exercise of ordinary skill in the art without departing from the scope of the invention.

The embodiments of the invention in which a property or privilege is claimed are described as follows:

1. In an active brake control system including a plurality of active brake control system components cooperative to selectively increase braking at individual automotive vehicle wheels in response to sensed vehicle turning maneuvers, a diagnostic method comprising the steps of:
   diagnosing individual component fault conditions characterized by reduced component operability;
   diagnosing correlation fault conditions characterized by substantial lack of correlation between predetermined active brake control parameters;
   diagnosing performance fault conditions characterized by reduced active brake control system performance; and
   restricting active brake control system authority when fault conditions are diagnosed.

2. The method of claim 1, wherein the step of diagnosing individual component fault conditions further comprises the steps of:
   reading component output signals;
   establishing signal tolerances corresponding to the component output signals describing signal ranges of operable components;
   comparing the component output signals to the established signal tolerances; and
   diagnosing an individual component fault condition when a component output signal exceeds a corresponding signal tolerance.

3. The method of claim 1, wherein the step of diagnosing correlation fault conditions further comprises the steps of:
   normalizing the predetermined active brake control system parameters to a common unit of measure;
   determining a difference between the normalized active brake control system parameters;
   comparing the difference to a predetermined difference threshold; and
   diagnosing correlation fault conditions when the difference exceeds the difference threshold.

4. The method of claim 1, wherein the step of diagnosing performance fault conditions further comprises the steps of:
   establishing a minimum active brake control system response threshold;
   measuring actual response of the active brake control system; and
   diagnosing a performance fault condition when the actual response is less than the minimum active brake control system response threshold.

5. The method of claim 4, wherein the measuring step further comprises the steps of:
   generating an active brake control parameter error value;
   determining the time rate of decrease of the error value toward zero to indicate the actual response of the active brake control system.

6. The method of claim 4, wherein the measuring step measures a time of activation of the active brake control system as an indication of actual response of the active brake control system.

7. The method of claim 1, wherein the restricting step restricts active brake control system authority by temporarily disabling the active brake control system while fault conditions are diagnosed.

8. The method of claim 1, further comprising the steps of:
   indicating the diagnosed fault condition; and
   storing a fault code in a memory device describing the diagnosed fault condition.

9. A diagnostic method for an active brake control system for automatically increasing braking at selected wheels of an automotive vehicle in response to detected vehicle turning maneuvers, comprising the steps of:
   sampling input signals from a plurality of transducers;
   detecting a turning maneuver as a function of the sampled input signals;
   activating the active brake control system to increase braking at selected vehicle wheels upon detecting the turning maneuver;
   diagnosing transducer circuit fault conditions;
   diagnosing a lack of correlation fault condition between sampled input signals;
   diagnosing performance fault conditions in the active brake control system; and
   deactivating the active brake control system upon diagnosing any of said fault conditions.

10. The method of claim 9, wherein the sampled input signals from the plurality of transducers indicate yaw rate and vehicle lateral acceleration control parameters.

11. The method of claim 10, further comprising the steps of:

estimating signal bias error in the sampled output signal for each of the plurality of transducers;

comparing at least one signal bias error to a corresponding bias error limit; and diagnosing transducer circuit fault conditions when a signal bias error persistently exceeds its corresponding bias error limit.

12. The method of claim 10, wherein the step of diagnosing performance fault conditions further comprises the repeated steps of:

logging a time of active brake control system activation in response to a detected turning maneuver;

comparing the logged time to a predetermined time limit; and diagnosing a performance fault condition when the logged time persistently exceeds the predetermined time limit.

13. The method of claim 12, further comprising the steps of:

isolating the source of the diagnosed performance fault condition; and storing a code indicating the performance fault condition and the isolated source of the performance fault condition.

14. The method of claim 9, wherein the step of diagnosing transducer circuit fault conditions further comprises the steps of:

establishing, for each of a plurality of transducers, a corresponding transducer output signal tolerance range;

comparing the sampled output signal from each of the plurality of transducers to the corresponding transducer output signal tolerance range; and diagnosing transducer circuit fault conditions when a sampled output signal persistently exceeds the corresponding transducer output signal tolerance range.

* * * * *